United States Patent [19]

Sato et al.

[11] Patent Number: 4,760,040

[45] Date of Patent: Jul. 26, 1988

[54] HYDROCARBON CATALYTIC CRACKING CATALYST COMPOSITIONS

[75] Inventors: Goro Sato; Masamitsu Ogata; Takanori Ida; Tatsuo Masuda, all of Kitakyushu, Japan

[73] Assignee: Catalysts & Chemicals Industries Co, Ltd., Tokyo, Japan

[21] Appl. No.: 889,644

[22] Filed: Jul. 24, 1986

[30] Foreign Application Priority Data

Aug. 5, 1985 [JP] Japan ................................ 60-172122

[51] Int. Cl.$^4$ ............................................. B01J 29/06
[52] U.S. Cl. ........................................ 502/68; 502/64
[58] Field of Search ...................... 502/64, 68, 214, 69

[56] References Cited

U.S. PATENT DOCUMENTS

| | | | |
|---|---|---|---|
| 4,086,187 | 4/1978 | Lim et al. ................................ | 502/68 |
| 4,476,239 | 10/1984 | Chiang et al. ......................... | 502/68 |
| 4,567,152 | 1/1986 | Pine ....................................... | 502/69 |

*Primary Examiner*—Carl F. Dees
*Attorney, Agent, or Firm*—Flynn, Thiel, Boutell & Tanis

[57] ABSTRACT

A catalyst composition that is prepared by adding phosphorus to a hydrogel slurry of fibrous pseudoboehmite having a diameter of 0.05–0.3 μ and a length of 0.5 μ or more, mixing a crystalline aluminosilicate zeolite and a clay mineral therewith, spray drying this mixture and calcining, and has a total pore volume (PV) of 0.3–0.7 cc/g, a volume (PVa) occupied by pores whose diameter is 600 Å or less of 0.3–0.7 cc/g and a PVb/PVa ratio where PV−PVa=PVb of 0.5–2.0, displays superior activity, selectivity and metals tolerance when used in the fluid cat-cracking of heavy hydrocarbon oils, in particular residual oils.

6 Claims, No Drawings

HYDROCARBON CATALYTIC CRACKING CATALYST COMPOSITIONS

BACKGROUND OF THE INVENTION

The present invention relates to hydrocarbon catalytic cracking catalyst compositions and in particular relates to catalyst compositions suitable for fluid catcracking of heavy hydrocarbon oils such as residual oil and the like.

As hydrocarbon catalytic cracking catalysts, there have generally been employed those catalysts comprising dispersed crystalline aluminosilicates in silica inorganic oxide matrixes such as silica, silica-alumina, silica-magnesia, silica-zirconia, silica-titania and the like. In addition thereto, catalysts using alumina as the matrix have been introduced in technical documents.

In the crystalline aluminosilicate zeolite-containing catalytic cracking catalysts mentioned above, it is generally said that the catalytic activity and selectivity to the $C_5+$ fraction of the catalyst can be enhanced by increasing the content of crystalline aluminosilicate zeolite. However, the increased amount of the crystalline aluminosilicate zeolite has a tendency to deteriorate the mechanical strength and weaken the attrition resistance of the catalyst particles. Accordingly, it has been customary in the enhancing of the activity and selectivity of the catalyst by increasing the content of the crystalline aluminosilicate zeolite, to adopt the steps of using silica sol (which see U.S. Pat. No. 4,022,714) and silica-alumina sol, the aluminum phosphate solution or the aluminium chlohydro (see Japanese Laid Open Patent Application No. 36637/1983) as bonding agents for the crystalline aluminosilicate zeolite. However, the fact is that as these usual bonding agents cover the surface of the crystalline aluminosilicate zeolite particles dispersed in the catalyst compositions densely, the cracking activity or selectivity of the catalysts can not be enhanced that much for the increased amount of crystalline aluminosilicate zeolite.

In view of this, the inventors of this application have proposed a method for preparing crystalline aluminosilicate zeolite-containing catalytic cracking catalyst compositions comprising peptizing pseudoboehmite with a suitable acid and using the same in place of the usual bonding agents, in the co-pending U.S. Ser. No. 811,617 filed Dec. 20, 1985 (now abandoned).

On the other hand, as the measure for improving the metals tolerance of the catalytic cracking catalysts, U.S. Pat. No. 4,430,199 discloses the step of containing a phosphorus component in a zeolite-containing catalytic cracking catalyst, and U.S. Pat. No. 4,183,803 teaches a catalytic cracking catalyst comprising dispersed zeolite in an alumino-aluminumphosphate-silica matrix. In addition, U.S. Pat. No. 3,711,422 describes that addition of an antimony compound to a catalytic cracking catalyst passivates metallic contaminants deposited on said catalyst, and U.S. Pat. No. 4,183,803 describes a process for passivating metallic contaminants by contacting the metallic contaminants-deposited catalyst with a compound of antimony, bismuth, phosphorus or the like. In addition, U.S. Pat. No. 4,222,896 describes a catalyst comprising dispersed zeolite in a $MgO-Al_2O_3-AlPO_4$ matrix. And, the co-pending U.S. Ser. No. 808,414 filed Dec. 12, 1985 (now abandoned) proposes a catalytic cracking catalyst composition comprising alumina particles containing a phosphorus component and having a particle diameter of 2–60 $\mu$, a crystalline aluminosilicate zeolite and a porous inorganic matrix.

SUMMARY OF THE INVENTION

The present invention provides catalytic cracking catalyst compositions wherein a fibrous pseudoboehmite hydrogel prepared under a specific condition is added to phosphorus and used as a bonding agent for an aluminosilicate zeolite as well as being utilized as part of the matrix. In more detail, the present invention provides catalyst compositions which are prepared by dispersing a crystalline aluminosilicate zeolite and clay in a hydrogel slurry of fibrous pseudoboehmite containing phosphorus in the atomic ratio of phosphorus to aluminum of 0.01–0.56 and having a diameter of 0.05–0.3 $\mu$ and a length of 0.5 $\mu$ or more, and spray drying this mixture and calcining, said catalyst compositions having a total pore volume (PV) of 0.3–0.7 cc/g, a volume (PVa) occupied by pores having a diameter of 600 Å or less of 0.1–0.3 cc/g and a ratio of PVb/PVa where PV-PVa=PVb of 0.5–2.0.

The catalyst compositions according to the present invention not only possess superior catalytic activity, selectivity and metals tolerance, but also are superior in the points of attrition resistance and thermal and hydrothermal stability.

DETAILED DESCRIPTION OF THE INVENTION

The hydrogel slurry of fibrous pseudoboehmite used in the present invention may be prepared by producing an alumina hydrogel slurry in the well known usual manner of, for instance, reacting an aqueous aluminum sulfate solution with an aqueous sodium aluminate solution, adjusting the pH of this hydrogel slurry in the range of 10 or more, preferably 10.5–11.5, and thereafter ageing at a temperature of 40°–90° C. for 1–72 hours. In preparing the alumina hydrogel slurry, it is desirable to adjust the alumina concentration of the reaction mixture in the range of 0.1–5.0 wt. %, preferably 0.5–3.6 wt. %, and the pH thereof in the range of 8.5–11.5. It is extremely important from the viewpoint of producing a fibrous pseudoboehmite and ultimately obtaining a catalyst having a superior attriton resistance to age the alumina hydrogel slurry in the pH range of 10 or more, preferably 10.5–11.5, at 40°–90° C. and for 1.72 hours. Because of this ageing, fibrous fine crystals of alumina are coordinated regularly to form bundles. Several bundles are connected to produce a fibrous pseudoboehmite having a diameter of 0.05–0.3 $\mu$ and a length of 0.5 $\mu$ or more. When the pH is less than 10 on ageing, the fibrous fine crystals can not be coordinated fully and there can not be obtained the fibrous pseudoboehmite as mentioned above. Raising the pH on ageing to more than 11.5 is not recommended for economic reasons, though it does not exert a bad influence on the production of fibrous pseudoboehmite. The diameter and length of the fibrous pseudoboehmite referred to herein are obtained by dispersing the alumin hydrogel aged under the above mentioned conditions in n-butanol, drying this dispersion at 83° C. for 24 hours under reduced pressure, photographing the resultant powder using an electron microscope of 100,000 magnifications, selecting 20 particles from thus photographed fibrous particles optionally, measuring the width and length of each particle, and finding out the average value. In this connection, it is to be noted that the average value of width corresponds to the diameter of the fibrous pseudoboehmite, and the average value of length corresponds to the length of the fibrous pseudoboehmite.

To the hydrogel slurry of fibrous pseudoboehmite is then added a phosphorus compound. As the phosphorus compound there may be used a soluble salt. However, the use of phosphoric acid is most preferred. The phosphorus compound is added to the hydrogel slurry of fibrous pseudoboehmite so that the atomic ratio of phosphorus to aluminum may be in the range of 0.01–0.56, preferably 0.02–0.28. Addition of surplus phosphorus exceeding the atomic ratio of phosphorus to aluminum of 0.56 is not preferable because it results in the crystal breakage of the crystalline aluminosilicate zeolite, while addition of a small amount of phosphorus below the atomic ratio of phosphorus to aluminum of 0.01 will not enhance the metals tolerance of the finally obtained catalyst composition as desired.

The hydrogel slurry of phosphorus-containing fibrous pseudoboehmite whose atomic ratio of phosphorus to aluminum is in the range of 0.01–0.56 is then mixed with a crystalline aluminosilicate and a clay mineral. The mixing ratios of the phosphorus-containing fibrous pseudoboehmite, the crystalline aluminosilicate zeolite and the clay mineral are controlled so that 15–75 wt. % of the final catalyst composition may be occupied by the phosphorus-containing alumina derived from the phosphorus-containing fibrous pseudoboehmite, 5–50 wt. % of the same may be occupied by the crystalline aluminosilicate zeolite and 0.80 wt. % of the same may be occupied by the clay mineral. As the clay minerals, there can be used kaolin, bentonite, halloysite and the like, but kaolin is most preferred. Upon occasion, part of the clay mineral may be replaced by a flash-calcined alumina.

The mixture of phosphorus-containing fibrous pseudoboehmite slurry, crystalline aluminosilicate zeolite and clay mineral is spray dried in a usual manner and calcined. Calcination is generally carried out at 400°–800° C. for about 1–6 hours, whereby there can be obtained a catalyst composition wherein the total pore volume (PV) is 0.3–0.7 cc/g, the pore volume (PVa) occupied by pores having a diameter of 600 Å or less is 0.1–0.3 cc/g and the ratio of PVb to PVa where PV-PVa=PVb is 0.5–2.0. In this instance, the total pore volume (PV) is the value measured by Water Titration Method disclosed in the article entitled "Total Porosity and Particle Density of Fluid Catalysts by Liquid Titration" by W. B. Innes, ANALYTICAL CHEMISTRY, Vol. 28, No. 3 (1956), and the volume (PVa) occupied by pores whose diameter is 600 Å or less is the value measured by the nitrogen adsorption method.

The cataltyst composition according to the present invention may contain at least one kind of metal component selected from the group consisting of alkali metals such as lithium and the like, alkaline earth metals such as magnesium, calcium and the like and rare earth metals, at will within the range of 0.1–5.0 wt. % (calculated in terms of oxide) of the final catalyst composition. Addition of metal components further enhances the gasoline selectivity of the catalyst composition of the present invention. The metal components may be added at optional steps of the manufacturing process of the catalyst composition, for instance may be added to the pseudoboehmite prior to the addition of phosphorus or simultaneously with said addition, or may be introduced in the catalyst composition after the calcining step by impregnation.

The catalyst composition according to the present invention, which contains the alumina derived from the above mentioned specific fibrous pseudoboehmite and phosphorus, is used in the catalytic cracking of heavy hydrocarbon oils, typically residual oils display superior catalytic performances in the points of catalytic activity, gasoline and intermediate fraction selectivity and metals tolerance. The catalytic cracking process using the catalyst composition of the present invention can be practiced under conventional operating conditions. Typical operating conditions include a temperature of 460°–540° C., a weight space velocity of 4–20 hr$^{-1}$ and a catalyst/feed weight ratio of 3–12. Furthermore, the catalyst composition of the present invention is so superior in thermal resistance that it does not deteriorate in its activity even when it is subjected to high temperatures such as 600° C.–750° C. in the usual catalyst regeneration process of the fluid cat-cracking process.

EXAMPLE 1

To a sodium aluminate solution (alumina concentration : 2.6 wt. %) was added an equivalent amount of aluminum sulfate solution (alumina concentration : 1.3 wt. %) to prepare an alumina hydrogel (pH: 9.5). The alumina contained in this alumina hydrogel was confirmed to be a pseudoboehmite by X-ray diffraction. This hydrogel was diluted with water, filtered and dewatered, and then was washed with a 0.3 wt. % ammonia aqueous solution. 15 wt. % ammonia water was added to the washed hydrogel to prepare 11 kinds of slurries of different pH, and each slurry was aged at 60° C. for 1 hour. Thereafter, each slurry was added to a 25 wt. % phosphoric acid aqueous solution and stirred so that the P/Al atomic ratio might get to the predetermined value. Then, each slurry was mixed with predetermined amounts of kaolin and crystalline aluminosilicate zeolite ($Na_2O$ content : 1.2 wt. %, unit cell size : 24.5 Å), and was spray dried, and thereafter calcined to prepare catalysts A, B, C, D, E, F, G, H, I, J and K respectively.

The composition, pH on ageing pseudoboehmite, size of aged pseudoboehmite, pore characteristics and attrition resistance of each catalyst are shown in the upper half of Table-1. The attrition resistance of each catalyst was evaluated based on the percentage of each catalyst which had been calcined at 600° C. for 2 hours, maintained at a fluid state for 30 hours under the air of fixed velocity and then powdered.

Comparative Example 1

Catalyst L was prepared according to the exact same procedure as catalyst A of Example 1 except that the amount of aged pseudoboehmite used and the amount of kaolin used were changed. Further, catalyst M was prepared according to the exact same procedure as Catalyst A of Example 1 except that no phosphoric acid aqueous solution was added to the aged pseudoboehmite. Still further, Catalyst N was prepared according to the exact same procedure as Catalyst A of Example 1 except that the ageing of the pseudoboehmite was conducted at pH of 8.7.

Comparative Example 2

A commercially available Water Glass No. 3 was diluted to prepare a water glass aqueous solution having a silica concentration of 12.7 wt. %. This aqueous solution and a 25% sulfuric acid were supplied simultaneously and continuously to a mixer at speeds of 20

1/min. and 5.6 1/min. respectively, thereby obtaining a silica sol. This silica sol was added to the fixed amounts of kaolin and crystalline aluminosilicate zeolite. This mixture was spray dried, contacted with a rare earth chloride aqueous solution and impregnated with a 1.05 wt. % (calculated in terms of $RE_2O_3$) rare earth component. Thereafter, this mixture was dried and calcined to prepare Catalyst O.

cracking test. Prior to the test, each catalyst was treated at 770° C. for 6 hours in 100% steam, and thereafter calcined at 600° C. for 1 hour. The catalytic cracking test was carried out by using a vacuum gas oil as the feed oil and under the conditions (reaction temperature : 500° C., WHSV : 15 $hr^{-1}$ and catalyst/feed oil weight ratio : 8). The test results are shown in the lower half of Table - 1.

TABLE 1

| Catalyst | A | B | C | D | E | F | G | H |
|---|---|---|---|---|---|---|---|---|
| Binder | P—$Al_2O_3$ | P—$Al_2O_3$ | P—$Al_2O_3$ | P—$Al_2O_3$ | P—$Al_2O_3$ | P—$Al_2O_3$ | P—$Al_2O_3$ | P—$Al_2O_3$ |
| Binder wt % | 25 | 25 | 25 | 25 | 25 | 25 | 25 | 20 |
| Kaolin wt % | 55 | 55 | 55 | 55 | 55 | 55 | 55 | 60 |
| Zeolite wt % | 20 | 20 | 20 | 20 | 20 | 20 | 20 | 20 |
| PH on ageing pseudoboehmite | 10.5 | 10.8 | 11.1 | 10.5 | 10.5 | 10.5 | 10.5 | 10.5 |
| Aged pseudoboehmite length (μ) | 1.50 | 1.65 | 1.90 | 1.50 | 1.50 | 1.50 | 1.50 | 1.50 |
| Aged pseudoboehmite diameter (μ) | 0.19 | 0.20 | 0.17 | 0.19 | 0.19 | 0.19 | 0.19 | 0.19 |
| P/Al atomic ratio | 0.14 | 0.14 | 0.14 | 0.02 | 0.07 | 0.28 | 0.58 | 0.14 |
| Properties of catalyst | | | | | | | | |
| ABD g/cc | 0.62 | 0.64 | 0.63 | 0.60 | 0.60 | 0.66 | 0.67 | 0.60 |
| Surface area m²/g | 196 | 206 | 171 | 208 | 203 | 168 | 96 | 178 |
| PV cc/g | 0.49 | 0.46 | 0.43 | 0.49 | 0.49 | 0.40 | 0.34 | 0.47 |
| PVa cc/g | 0.19 | 0.19 | 0.19 | 0.23 | 0.22 | 0.18 | 0.11 | 0.21 |
| (PV-PVa)/PVa ratio | 1.58 | 1.42 | 1.26 | 1.13 | 1.22 | 1.22 | 2.09 | 1.24 |
| Attrition resistance wt %/hr | 0.09 | 0.09 | 0.15 | 0.13 | 0.13 | 0.12 | 0.17 | 0.19 |
| Activity evaluation results | | | | | | | | |
| Conversion vol % | 78.8 | 79.2 | 77.2 | 73.5 | 77.8 | 78.5 | 47.3 | 76.9 |
| $H_2$~$C_2$ wt % | 1.26 | 1.25 | 1.25 | 1.23 | 1.16 | 1.26 | 1.21 | 1.46 |
| $C_3$~$C_4$ vol % | 29.9 | 29.6 | 27.1 | 26.7 | 28.1 | 28.4 | 13.3 | 30.8 |
| (a) gasoline vol % | 65.3 | 65.8 | 65.5 | 64.0 | 65.9 | 66.5 | 43.3 | 62.7 |
| (b) LCO vol % | 16.1 | 16.4 | 17.6 | 19.6 | 17.1 | 16.5 | 24.9 | 17.1 |
| (c) $HCO^+$ vol % | 5.1 | 4.4 | 5.2 | 6.9 | 5.1 | 5.0 | 27.8 | 6.0 |
| Coke wt % | 4.4 | 4.1 | 3.8 | 2.8 | 3.4 | 3.4 | 1.7 | 4.1 |
| RON | 91.6 | 91.5 | 91.3 | 93.1 | 92.5 | 91.2 | 92.3 | 92.1 |
| (d) $CO_2/CO$ | 4.3 | 4.2 | 3.9 | 4.4 | 4.6 | 4.3 | 3.1 | 4.3 |

| Catalyst | I | J | K | L | M | N | O |
|---|---|---|---|---|---|---|---|
| Binder | P—$Al_2O_3$ | P—$Al_2O_3$ | P—$Al_2O_3$ | P—$Al_2O_3$ | $Al_2O_3$ | P—$Al_2O_3$ | $Si_2O$ |
| Binder wt % | 40 | 60 | 25 | 10 | 25 | 25 | 25 |
| Kaolin wt % | 40 | 0 | 65 | 70 | 55 | 55 | 45 |
| Zeolite wt % | 20 | 40 | 10 | 20 | 20 | 20 | 20 |
| PH on ageing pseudoboehmite | 10.5 | 10.5 | 10.5 | 10.5 | 10.5 | 8.7 | — |
| Aged pseudoboehmite length (μ) | 1.50 | 1.50 | 1.50 | 1.50 | 1.50 | — | — |
| Aged pseudoboehmite diameter (μ) | 0.19 | 0.19 | 0.19 | 0.19 | 0.19 | — | — |
| P/Al atomic ratio | 0.14 | 0.14 | 0.14 | 0.14 | 0 | 0.14 | — |
| Properties of catalyst | | | | | | | |
| ABD g/cc | 0.65 | 0.59 | 0.66 | 0.56 | 0.58 | 0.51 | 0.70 |
| Surface area m²/g | 213 | 316 | 151 | 151 | 216 | 238 | 250 |
| PV cc/g | 0.38 | 0.54 | 0.44 | 0.51 | 0.54 | 0.59 | 0.24 |
| PVa cc/g | 0.23 | 0.28 | 0.17 | 0.20 | 0.27 | 0.23 | 0.18 |
| (PV-PVa)/PVa ratio | 0.65 | 0.93 | 1.59 | 1.55 | 1.00 | 1.57 | 0.33 |
| Attrition resistance wt %/hr | 0.10 | 0.12 | 0.08 | 0.78 | 0.17 | 0.85 | 0.15 |
| Activity evaluation results | | | | | | | |
| Conversion vol % | 77.7 | 81.0 | 70.1 | — | 71.5 | — | 74.8 |
| $H_2$~$C_2$ wt % | 1.26 | 1.54 | 1.08 | — | 1.27 | — | 1.04 |
| $C_3$~$C_4$ vol % | 27.6 | 34.0 | 21.2 | — | 24.1 | — | 26.4 |
| (a) gasoline vol % | 65.6 | 62.5 | 63.9 | — | 62.6 | — | 64.8 |
| (b) LCO vol % | 17.7 | 14.4 | 22.4 | — | 20.1 | — | 17.2 |
| (c) $HCO^+$ vol % | 4.6 | 4.6 | 7.5 | — | 8.4 | — | 8.0 |
| Coke wt % | 4.2 | 5.8 | 2.2 | — | 2.5 | — | 2.5 |
| RON | 90.6 | 91.5 | 91.6 | — | 93.4 | — | 92.5 |
| (d) $CO_2/CO$ | 3.8 | 4.6 | 4.3 | — | 4.2 | — | 2.4 |

(a) Boiling point range $C_5$~204° C.
(b) Boiling point range 204° C.~343° C.
(c) Boiling point range 343° C. or more
(d) $CO_2/CO$ molar ratio in exhaust gas from regenerative tower The composition, properties and the like of each of the catalysts obtained in Comparative Examples 1 and 2 are shown in the upper half of Table - 1.

EXAMPLE 2

The performances of the respective catalysts prepared in the above mentioned Example 1 and Comparative Examples 1 and 2 were evaluated by the catalytic

EXAMPLE 3

An alumina hydrogel slurry was prepared according to the same manner as Example 1, and was divided into three equal parts. One part was mixed with a magnesium hydroxide hydrogel so that the amount of alumina plus magnesium oxide based on magnesium oxide might become 8 wt. %. Likewise, the remaining two alumina hydrogel slurries were mixed with a calcium hydroxide hydrogel and a rare earth hydroxide hydrogel respectively. The pH of the three kinds of resultant mixed slurries was adjusted to 10.5 with an ammonia water. Thereafter, these slurries were aged at 60° C. for 1 hour respectively.

Then, aged slurry was added to a 25 wt. % phosphoric acid aqueous solution so that the P/Al atomic ratio might become 0.14, and then mixed with fixed amounts of kaolin and crystalline aluminosilicate zeolite. The respective mixtures were spray dried, and thereafter calcined at 600° C. for 2 hours, thereby preparing Catalysts P, Q and R. Further, part of Catalyst B, prepared in Example 1, was impregnated with a lithium chloride aqueous solution, dried and thereafter calcined to prepare Catalyst S containing a 2 wt. % (calculated in terms of $Li_2O$) lithium component.

The composition, pore characteristics and attrition resistance of the above mentioned respective catalysts, and the results of the catalytic cracking test carried out in the same manner as Example 2 are shown in Table - 2.

EXAMPLE 4

Catalysts A, P, Q, R and S of the present invention and control Catalyst O were evaluated with respect to the catalytic cracking activity, using the residual oil having the under mentioned properties as the feed oil. Prior to the catalytic cracking test, each catalyst was treated at 750° C. for 17 hours in a 100% steam and thereafter calcined at 600° C. for 1 hour. The catalytic cracking test was carried out under the conditions (reaction temperature : 500° C., WHSV : 11 $hr^{-1}$ and catalyst/feed oil weight ratio : 6.5). The obtained test results are shown in Table - 3.

| Properties of residual oil | |
|---|---|
| Specific Gravity | 0.929 |
| Sulfur | 0.18 wt. % |
| Conradoson carbon | 4.7 wt. % |
| IBP | 270° C. |
| 10% | 407° C. |
| 50% | 521° C. |
| Nickel | 2.5 ppm |
| Vanadium | 2.9 ppm |

TABLE 2

| Catalyst | P | Q | R | S |
|---|---|---|---|---|
| Binder | P—$Al_2O_3$ | P—$Al_2O_3$ | P—$Al_2O_3$ | p—$Al_2O_3$ |
| Binder wt % | 25 | 25 | 25 | 25 |
| Kaolin wt % | 55 | 55 | 55 | 55 |
| Zeolite wt % | 20 | 20 | 20 | 20 |
| Metal component | Mg | Ca | RE | Li |
| PH on ageing pseudoboehmite | 10.5 | 10.5 | 10.5 | 10.8 |
| Aged pseudoboehmite length (μ) | 1.25 | 1.25 | 1.25 | 1.65 |
| Aged pseudoboehmite diameter (μ) | 0.17 | 0.17 | 0.17 | 0.20 |
| P/Al atomic ratio | 0.14 | 0.14 | 0.14 | 0.14 |
| Properties of catalyst | | | | |
| ABD g/cc | 0.62 | 0.61 | 0.62 | 0.64 |
| Surface area $m^2$/g | 215 | 213 | 203 | 201 |
| PV cc/g | 0.47 | 0.47 | 0.45 | 0.46 |
| PVa cc/g | 0.20 | 0.20 | 0.19 | 0.18 |
| (PV-PVa)/PVa ratio | 1.35 | 1.35 | 1.36 | 1.56 |
| Attrition resistance wt %/hr | 0.17 | 0.18 | 0.12 | 0.10 |
| Activity evaluation results | | | | |
| Conversion vol % | 77.7 | 77.3 | 78.2 | 81.0 |
| $H_2$~$C_2$ wt % | 1.14 | 1.10 | 1.16 | 1.44 |
| $C_3$~$C_4$ vol % | 26.5 | 26.6 | 27.9 | 32.0 |
| (a) gasoline vol % | 66.5 | 66.3 | 66.8 | 64.5 |
| (b) LCO vol % | 18.3 | 18.5 | 17.8 | 15.2 |
| (c) $HCO^+$ vol % | 4.0 | 4.2 | 4.0 | 3.8 |
| Coke wt % | 3.4 | 3.2 | 3.6 | 5.8 |
| RON | 91.4 | 91.4 | 91.6 | 91.5 |
| (d) $CO_2$/CO | 5.5 | 5.6 | 5.4 | 6.5 |

(a) Boiling point range $C_5$~204° C.
(b) Boiling point range 204° C.~343° C.
(c) Boiling point range 343° C. or more
(d) $CO_2$/CO molar ratio in exhaust gas from regenerative tower

TABLE 3

| Catalyst | O | A | P | Q | R | S |
|---|---|---|---|---|---|---|
| Conversion vol % | 75.1 | 77.8 | 76.8 | 76.4 | 76.7 | 80.5 |
| $H_2$~$C_2$ wt % | 1.99 | 1.59 | 1.38 | 1.36 | 1.33 | 1.78 |
| $C_3$~$C_4$ vol % | 20.7 | 23.0 | 21.3 | 21.5 | 20.9 | 24.1 |
| Gasoline vol % | 56.7 | 60.1 | 61.7 | 61.4 | 62.0 | 59.0 |
| LCO vol % | 16.3 | 15.3 | 17.1 | 17.3 | 17.5 | 13.9 |
| $HCO^+$ vol % | 8.6 | 6.9 | 6.1 | 6.3 | 5.8 | 5.6 |
| Coke wt % | 17.8 | 15.9 | 14.2 | 14.8 | 14.5 | 16.8 |

EXAMPLE 5

In this example, Catalysts B, P, Q, R and S of the present invention and the control Catalyst O were evaluated with respect to of the metals tolerance. Each catalyst absorbed a benzene solution of nickel naphthenate and vanadium naphthenate, dried at 110° C., and then calcined at 600° C. for 1.5 hours, thereby preparing a catalyst in which fixed amounts of nickel and vanadium deposited in the V/Ni atomic ratio of 2. Then, metals deposited or nondeposited catalysts were each steam-treated at 770° C. for 6 hours and thereafter calcined again at 600° C. for 1 hour.

The thus pretreated respective catalysts were subjected to the ASTM MAT test, wherein desulfurized vacuum gas oil was used as feed oil, and a reaction temperature 482° C., space velocity 16 $hr^{-1}$ and catalyst/feed oil weight ratio 3 were employed as the reaction conditions. The test results are shown in Table - 4.

TABLE 4

| Catalyst No. | O | | | B | | | S | | |
|---|---|---|---|---|---|---|---|---|---|
| Deposited metal | 0 | 6,500 | 12,000 | 0 | 6,500 | 12,000 | 0 | 6,500 | 12,000 |
| Activity evaluation | | | | | | | | | |
| Conversion wt % | 63.1 | 42.6 | 30> | 73.2 | 61.3 | 50.4 | 75.1 | 62.6 | 51.8 |
| $C_5^+$ gasoline wt % | 48.0 | 30.1 | — | 54.2 | 46.0 | 36.1 | 55.1 | 47.0 | 37.3 |
| Hydrogen wt % | 0.06 | 0.75 | — | 0.08 | 0.68 | 0.98 | 0.08 | 0.60 | 0.91 |
| Coke wt % | 1.7 | 2.1 | — | 3.1 | 4.3 | 5.6 | 3.4 | 4.1 | 5.0 |
| Catalyst No. | P | | | Q | | | R | | |
| Deposited metal | 0 | 6,500 | 12,000 | 0 | 6,500 | 12,000 | 0 | 6,500 | 12,000 |
| Activity evaluation | | | | | | | | | |
| Conversion wt % | 73.1 | 64.2 | 54.0 | 73.3 | 63.1 | 53.2 | 73.9 | 64.6 | 55.5 |
| $C_5^+$ gasoline wt % | 55.0 | 47.9 | 40.1 | 54.7 | 47.1 | 38.2 | 55.5 | 47.3 | 41.1 |
| Hydrogen wt % | 0.08 | 0.63 | 0.93 | 0.08 | 0.60 | 0.91 | 0.07 | 0.63 | 0.90 |
| Coke wt % | 2.9 | 3.8 | 4.8 | 3.0 | 4.0 | 4.9 | 2.7 | 4.0 | 5.1 |

As is evident from Table - 4, Catalysts B, P, Q, R and S of the present invention are superior in metals tolerance as compared with the control Catalyst O. Among the catalysts of the present invention, Catalysts P, Q, R and S containing an alkali metal, an alkali earth metal or a rare earth metal are much better in metals tolerance than Catalyst B containing no such additional metals.

We claim:

1. A hydrocarbon catalytic cracking catalyst composition that is prepared by adding a phosphorus compound to a hydrogel slurry of fibrous pseudoboehmite having a diameter of 0.05–0.3 μ and a length of 0.5 μ or more so that the P/Al atomic ratio is 0.01–0.56, said fibrous pseudoboehmite having been prepared by ageing an alumina hydrogel slurry having a pH of 10 or more at 40°–90° C. for 1–72 hours, further mixing a crystalline aluminosilicate zeolite and, optionally, a clay material with said hydrogel slurry of phosphorus-containing fibrous pseudoboehmite to form a resultant mixture, spray drying and then calcining the resultant mixture to form a catalyst composition, said catalyst composition comprising said crystalline aluminosilicate zeolite and, optionally, said clay material, dispersed in a matrix of phosphorus-containing alumina obtained from said phosphorus-containing fibrous pseudoboehmite, said catalyst composition having a total pore volume of 0.3–0.7 cc/g, a volume (PVa) occupied by pores having a diameter of 600° or less of 0.1–0.3 cc/g and a PVb/PVa ratio of 0.5–2.0, where PV-PVa =PVb.

2. The catalyst composition as claimed in claim 1 consisting essentially of 15–75 wt. % of the alumina and the phosphorus pentoxide derived from the phosphorus-containing pseudoboehmite, 5–50 wt. % of the crystalline aluminosilicate zeolite and 0–80 wt. % of the clay material.

3. The catalyst composition as claimed in claim 1 containing 0.1–5.0 wt. %, as the oxide, of at least one metal component selected from the group consisting of alkali metals, alkaline earth metals and rare earth metals.

4. The catalyst composition as claimed in claim 1, wherein the hydrogel comprises a reaction product of sodium aluminate and aluminum sulfate.

5. The catalyst composition as claimed in claim 1 in which said alumina hydrogel slurry has a pH of 10.5 to 11.5.

6. The catalyst composition as claimed in claim 2 in which said phosphorus-containing pseudoboehmite has a P/Al atomic ratio of from 0.2 to 0.28.

* * * * *

UNITED STATES PATENT AND TRADEMARK OFFICE
CERTIFICATE OF CORRECTION

PATENT NO. : 4 760 040

DATED : July 26, 1988

INVENTOR(S) : Goro SATO et al

It is certified that error appears in the above-identified patent and that said Letters Patent is hereby corrected as shown below:

Column 10, line 3; after "volume" insert ---(PV)---.

line 21; change "600°" to ---600Å---.

line 30; after "wt. %," insert ---calculated---.

line 41; change "0.2" to ---0.02---.

Signed and Sealed this

Fourteenth Day of March, 1989

Attest:

DONALD J. QUIGG

*Attesting Officer*   *Commissioner of Patents and Trademarks*